United States Patent [19]
Kobayashi et al.

[11] 3,891,574
[45] June 24, 1975

[54] HOLLOW SPHERES OF ACTIVATED CARBON AND METHOD FOR MANUFACTURE THEREOF

[75] Inventors: Kazuo Kobayashi; Shinjiro Watari; Tsutomu Kato; Minoru Shiraishi; Yoshio Kawana, all of Kawaguchi, Japan

[73] Assignee: Agency of Industrial Science & Technology, Tokyo, Japan

[22] Filed: Aug. 31, 1972

[21] Appl. No.: 285,509

[30] Foreign Application Priority Data
Nov. 15, 1971   Japan.................................. 46-91287

[52] U.S. Cl. ............ 252/421; 210/DIG. 21; 210/40; 252/445; 264/29; 423/244
[51] Int. Cl............................................. C01b 31/08
[58] Field of Search ............ 252/421, 445; 423/449, 423/445; 201/6, 23

[56] References Cited
UNITED STATES PATENTS

| | | | |
|---|---|---|---|
| 1,783,110 | 11/1930 | Defris | 252/421 |
| 3,111,396 | 11/1963 | Ball | 423/449 |
| 3,446,593 | 5/1969 | Moutaud | 423/449 |
| 3,533,753 | 10/1970 | Berger | 252/422 |
| 3,533,961 | 10/1970 | Voet et al. | 252/421 |
| 3,623,999 | 11/1971 | Jungten et al. | 252/421 |
| 3,630,959 | 12/1971 | Kiikka | 252/421 |
| 3,775,344 | 11/1973 | Amagi et al. | 252/444 |

FOREIGN PATENTS OR APPLICATIONS

| | | | |
|---|---|---|---|
| 1,086,864 | 10/1967 | United Kingdom | 252/421 |

*Primary Examiner*—Winston A. Douglas
*Assistant Examiner*—P. E. Konopka
*Attorney, Agent, or Firm*—Kurt Kelman

[57] ABSTRACT

A sphere of carbon which encloses an empty space and has pores formed in the shell thereof so as to provide free passage between the interior and the exterior of the sphere is obtained by coating a spherical core with a layer of finely divided coal and subjecting the coated sphere to a heat treatment at a temperature higher than the decomposition temperature of the substance of which the core is formed. The heat treatment causes the core to be thermally decomposed and evacuated from the coat which, by this time, has been hardened to a shell. A lightweight hollow sphere of activated carbon which has been activated not merely on the outer surface of the sphere but equally on the inner surface defining the empty space is produced by calcining for activation the said sphere of finely divided coal, with the said fine pores retained intact.

1 Claim, 1 Drawing Figure

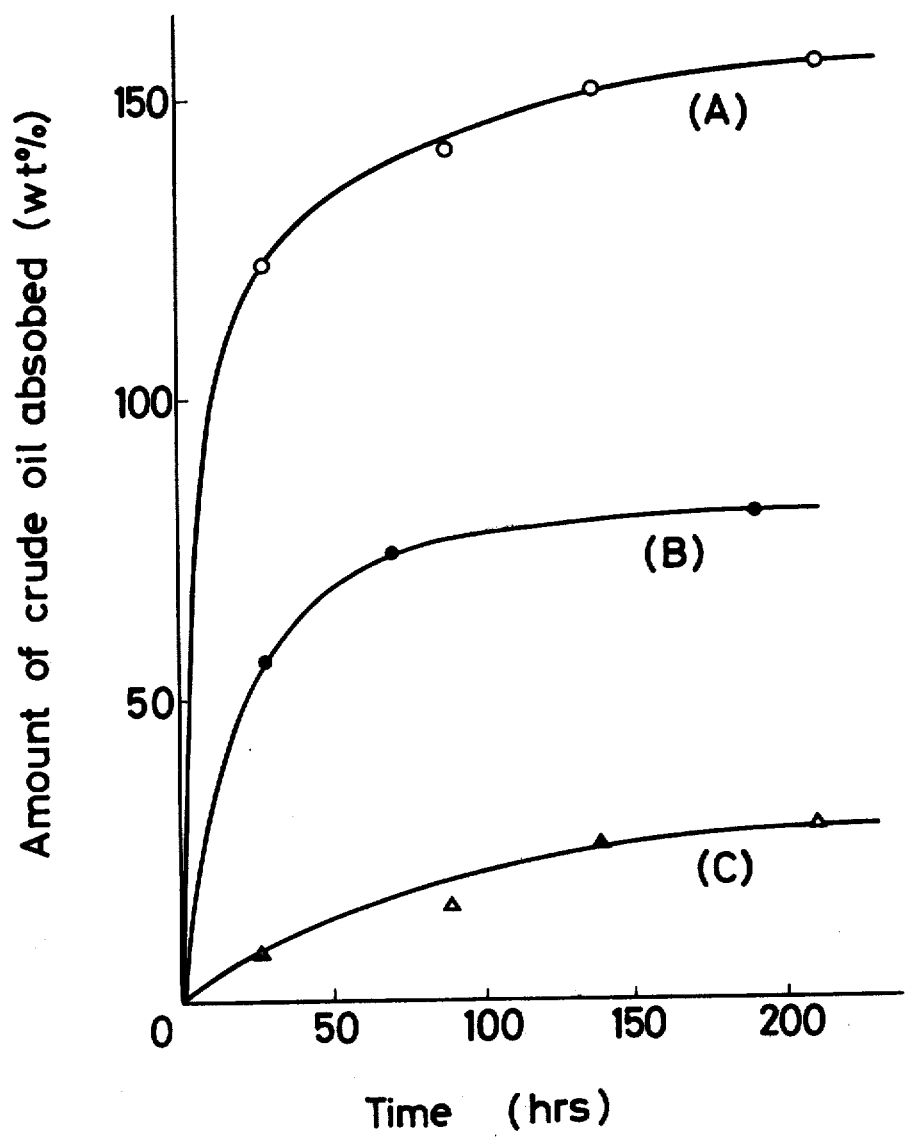

HOLLOW SPHERES OF ACTIVATED CARBON AND METHOD FOR MANUFACTURE THEREOF

This invention relates to a hollow sphere of activated carbon and a new method for the manufacture thereof.

According to the method heretofore employed for the manufacture of activated carbon in a spherical shape, the sphere must inevitably be limited in diameter in order that the carbonization of raw material and the activation of the carbonized sphere may effectively be accomplished throughout the entire sphere. If a given sphere of carbon happens to have a diameter exceeding the prescribed limit, there is a possibility that the carbonization will occur unevenly and the sphere itself will sustain cracks. In carrying out the treatment of activation, therefore, a fairly long time must be used for activation in order that diffusion of activating agent into individual component particles may be effected thoroughly to the center of the sphere. If the activation is performed over an ample length of time to ensure thorough diffusion, however, there will inevitably be involved various drawbacks such as lowered strength and decreased yield of activated carbon, degraded product properties and increased production cost. With a view to decreasing resistance offered to the passage of gases or liquids being treated and thereby improving the operational efficiency, those who use activated carbon for desulfurization of smoke, treatment of industrial wastes and other operations directed to the prevention of environmental pollution have long been awaiting completion of an activated carbon sphere which is increased in diameter and decreased in weight.

Formerly, the inventors proposed a method for manufacturing, from coal, activated carbon in the form of a sphere having a desired shape and a uniform diameter. According to this method, a sphere of activated carbon which excels in adsorption ability and mechanical strength, has a high bulk density and suits a wide range of uses can be manufactured in high yields.

The sphere of activated carbon manufactured according to the present invention is further improved over that of the method mentioned above. The main object of this invention is to provide an active carbon sphere containing an empty space at the center thereof, so that the desired adsorption can be effected not merely on the outer surface but additionally on the inner surface defining the said empty space. Thus, the activated carbon sphere hereof is decreased in weight and markedly increased in adsorption capacity.

Other objects and other characteristic features of the present invention will become apparent from the accompanying drawing and the further description of the invention to be made hereinafter with reference to the drawing.

The attached drawing is a graph illustrating the relationship between the amount of oil adsorbed by the activated carbon of the present invention and time.

Brown coal, sub-bituminous coal, bituminous coal, anthracite coal, or non-caking coal selected as raw material is finely pulverized. These finely pulverized coals are used either separately in their unmixed form or in the combined form of homogeneous mixtures of one coal with another. The raw material is desired to be divided as finely as permissible. In the form of lumps, such raw material coals are heterogeneous. Homogenization of raw material can be accomplished by finely pulverizing the selected coal or coals and intimately mixing the resulting fine coal particles. The fine coal particles have a large specific surface area, so that cohesion of surface-chemical nature tends to occur thereon.

Further, since they have an amorphous shape, they are liable to cohere by virtue of mechanical entanglement. The factors which contribute to such chemical and mechanical phenomena of cohesion lend themselves to enhance the strength of the final product to be formed in the shape of a sphere.

Now, the homogeneous mixtures of fine particles of raw material coal is intimately kneaded with such hydrophilic binder as pitch emulsion, spent sulfite pulp liquor or CMC, i.e., carboxymethylcellulose, which effectively functions in the presence of water. If it is desired to add a water-repellent binder to the finely divided coal which is wetted with water, then the purpose can be accomplished by using that binder in the form of a hydrophilic emulsion. In that form, the binder can be added in a small amount and uniformly kneaded with the finely divided coal. At normal room temperature under atmospheric pressure, a spherical core is coated with the resulting mixture and the coated sphere is rolled to form a coal sphere of a desired diameter. The core is formed of an organic high molecular substance. Among organic high molecular substances usable as materials for the spherical core mentioned above, thermoplastic resins are generally found to be desirable for the purpose. Styrol (styrene) resins, polyvinyl chloride, polyethylene, polypropylene, methacrylic resins, vinylidene chloride, fluorine resins, pitches and the like are typical of such substances. Foaming plastic substances are particularly suitable as materials for the core. When such an organic high molecular substance is pre-formed in the shape of a core having a suitable diameter, it may be directly put to use without further modification. When it is still in the form such as of powder, it is suitably molded to a required shape.

A sphere of coal which is obtained by coating a spherical core of an organic high molecular substance with a layer of finely divided coal having a required thickness is dried and thereafter heated to the temperature at which the said substance undergoes thermal decomposition, so that it will be converted into a hollow sphere of coal containing an empty space within. In the case of a core material which involves vigorous generation of a gas in the course of thermal decomposition, there is a fair possibility that the inner pressure will rise rapidly to crack or disintegrate the layer of finely divided coal. In such case, it is found necessary to decrease amply the rate of temperature rise as the temperature approaches the thermal decomposition point of the core material, so that the velocity at which the gas is generated may sufficiently be reduced. The diameter of the carbon sphere, the diameter of the empty space and the thickness of the coat are suitably selected in the course of pelletization of the coal sphere so as to suit the purpose for which the end product will be used and it is possible to manufacture a sphere having a diameter as large as 10 mm or more which is several times the diameter of the spheres producible by known methods.

A hollow sphere of coal which has been formed to a desired shape as mentioned above is modified by being heated in the current of an inert gas within a furnace of the compactly packed moving bed or fluidized bed (having a distinct boundary between the bed of raw material and the gaseous phase) type. This modification is effected at the first-order decomposition temperature of the coal which is used as the starting material. As the hollow sphere is elevated to the first-order decomposition temperature, the coal has its structure modified in consequence of the vigorous generation of gas and tar.

The hollow sphere of coal which has been modified is now subjected to another heat treatment. This time, it is sintered at temperatures in the range of from slightly over the decomposition point of the raw material coal to 550°C. The heat treatment given in this temperature range permits the sphere to be sintered to a degree of strength such that no inconvenience will arise in any of the subsequent treatments. The hollow sphere of carbon obtained by the said sintering treatment has a sturcture in which fine pores are formed in the shell of the sphere, extending between the inner and outer surfaces of the sphere. Consequently, the ambient air finds free access, through these fine pores, to the empty space enclosed within the sphere.

The hollow sphere of carbon which has been sintered is subsequently heated to 600°–1,100°C in the atmosphere of such inert gas as nitrogen so as to undergo dehydrogenation preponderantly, with the result that the carbon is solidified. During this treatment, the sintered hollow sphere of carbon obtained according to the method of this invention retains strength sufficient to endure the carbonization treatment. It can, therefore, be carbonized while retaining its shape intact and inducing no cohesion of adjacent spheres. The furnace to be used for carbonization may freely be selected from among the furnaces of the fixed bed type, fluidized bed type and rotary type. Further, the operation of carbonization is very easy to perform.

The hollow sphere of carbon consequently obtained is then activated by being elevated to temperatures exceeding 750°C and exposed to the current of such reactive gases as carbon monoxide, oxygen and nitrogen. Since the shell of carbon contains fine pores extending from the inner surface defining the empty space to the outer surface as mentioned above, the activating agent can quite readily be diffused into the interior of the sphere. Consequently, the hollow sphere of carbon is activated simultaneously on the inner and outer surfaces, so that sufficient activation can be accomplished in a shorter period of time by using a smaller amount of activating agent than by any other ordinary method of activation. Thus, the activation yield is heightened and the production cost is lowered. From the standpoint of properties, the hollow sphere of activated carbon enjoys remarkably high strength because it contains an empty space capable of absorbing shock exerted thereon from outside. Further, it enjoys very high adsorption velocity, because both the inner and outer surfaces of the sphere are available for adsorption. For the same reason as in the case of the furnace for carbonization, the type of activation furnace can freely be selected. The operation of activation is similarly easy to perform.

The hollow sphere of activated carbon which has been activated in the manner mentioned above acquires improved properties when it is refined by washing with acid and with water.

In the hollow sphere of activated carbon manufactured according to the method of this invention, fine pores are formed in the shell when the gas generated in consequence of the thermal decomposition of the core escapes confinement within the sphere. During the activation treatment, therefore, the activating agent is readily diffused not merely on the outer surface of the sphere but equally on the inner surface defining the empty space, with the result that the activation is completed in a shorter period of time. Thus, the activation produces light-weight activated carbon of excellent adsorption capacity in higher yields.

The following preferred embodiments are illustrative of the present invention and are not to be construed as limitative in any way.

EXAMPLE

Weakly bituminous coal (Akahira Coal) having 6.8% ash content was comminuted to a size smaller than 100 mesh and intimately blended with 15% of spent sulfite pulp liquor added as the binder. Foamed styrol (styrene) resin spheres 2 to 5 mm in diameter adopted as cores were coated with the coating material to thicknesses of from 2 to 5 mm. Consequently, coated spheres 7 to 12 mm in diameter were obtained. After drying, these spheres and a bulk density of 0.43. When these spheres were heated up to 300°C at the rate of 2°C/min in the atmosphere of nitrogen, the foamed styrol (styrene) cores were decomposed and hollow spheres of a coal texture were produced. When these spheres of coal were sintered by a heat treatment at 530°C and then held at 600°C for 30 minutes, spheres of carbon were obtained in a yield of 63.7%. These spheres had a bulk density of 0.428. When these spheres of carbon were activated with steam at 900°C, there were obtained hollow spheres of activated carbon in a yield of 34.0% with reference to the aforementioned spheres of carbon.

The properties of these spheres of activated carbon and those of the conventional activated carbon are compared in Table. The term "spheres of activated carbon" given in Table refers to those obtained by repeating the procedure described above, except that no core was used.

Table

| Kind of activated carbon | Hollow spheres of activated carbon by this invention | Spheres of activated carbon | Granular activated carbon available on the market |
|---|---|---|---|
| Diameter (mm) | 7 – 12 | 1 – 3 | 0.4 – 1.8 |
| Bulk density (kg/lit) | 0.274 | 0.54 | 0.47 |
| Micro-strength (%) | 94 | 92 | 75 |
| Inner specific surface area | 1,000 | 800 | 1,300 |
| $CO_2$ absorbed (wt %) | 23 | 20 | 10 |
| Benzene absorption capacity (wt%) | 34 | 31 | 36 |
| Methylene blue decolorizing capacity (ml/g) | 160 | 120 | 150 |
| Caramel decolorizing capacity (%) | 93.8 | 90.5 | 95.0 |

The relationship between the amount of crude oil adsorbed and the time as determined with respect to the aforementioned kinds of activated carbon is shown in the accompanying graph.

The graph shows the time-course changes in the amount of crude oil adsorbed by the different kinds of activated carbon; the curve (A) representing those of hollow spheres of activated carbon according to the present invention, the curve (B) those of solid spheres of activated carbon and the curve (C) those of hollow spheres of carbon prior to activation by steam.

It is clearly seen from the graph that the hollow spheres of activated carbon far excelled solid spheres of activated carbon and hollow spheres of unactivated carbon in terms of amount of adsorption and adsorption velocity.

We claim:

1. A method for the manufacture of a hollow sphere of activated carbon, which method consists essentially of:
   A. blending finely pulverized coal with a hydrophilic binder selected from the group consisting of pitch emulsion, spent sulfite pulp liquor and carboxymethylcellulose;
   B. coating a layer of the blend from Step (A) on a 2 to 5 mm diameter spherical core of styrene resin having a lower melting point than said coal, the coated sphere having a 7 to 12 mm diameter;
   C. drying the coated sphere of Step (B);
   D. subjecting the coated sphere of Step (C) to heat treatment in a nitrogen atmosphere at a temperature higher than the decomposition temperature of the core, the heat treatment being at a rate such that inner pressure of the coated sphere is below the pressure that will crack or disintegrate the layer of finely divided coal, thereby causing the core to be decomposed and evacuated within the shell of carbon and, at the same time, allowing gas emanating from the decomposed core to form fine pores extending from the inner to the outer surface of the shell;
   E. sintering the resulting hollow sphere of coal from Step (D) at temperatures between the first-order decomposition temperature of the raw material coal and 550°C.;
   F. dehydrogenating the sintered hollow sphere of carbon from Step (E) in an atmosphere of inert nitrogen gas at a temperature of from 600° to 1,100°C.; and
   G. activating both the inner and outer surfaces of the hollow sphere of carbon from Step (F) in a current of reactive gas consisting essentially of steam at temperatures exceeding 750°C.

* * * * *